United States Patent [19]
Genov et al.

[11] Patent Number: 5,993,142
[45] Date of Patent: Nov. 30, 1999

[54] ROBOT HAVING MULTIPLE DEGREES OF FREEDOM IN AN ISOLATED ENVIRONMENT

[75] Inventors: Genco Genov, San Jose; Alexander Todorov, Sunnyvale, both of Calif.

[73] Assignee: Genmark Automation, Inc., Sunnyvale, Calif.

[21] Appl. No.: 08/889,907

[22] Filed: Jul. 10, 1997

[51] Int. Cl.[6] .................................................. B25J 11/00
[52] U.S. Cl. ...................... 414/744.5; 414/936; 901/15; 74/490.05
[58] Field of Search .................. 414/744.5, 936; 901/15, 28, 29; 74/490.01, 490.05, 490.08; 187/267, 268

[56] References Cited

U.S. PATENT DOCUMENTS

| | | | |
|---|---|---|---|
| 4,732,525 | 3/1988 | Neumann | 414/735 |
| 5,007,784 | 4/1991 | Genov et al. | 414/744.6 |
| 5,064,340 | 11/1991 | Genov et al. | 414/744.5 |
| 5,116,190 | 5/1992 | Silke | 414/735 |
| 5,178,512 | 1/1993 | Skrobak | 414/744.5 |
| 5,234,303 | 8/1993 | Koyano . | |
| 5,656,905 | 8/1997 | Tsai | 74/479.01 |
| 5,715,729 | 2/1998 | Toyama et al. | 74/490.03 |
| 5,813,287 | 9/1998 | McMurty et al. | 74/490.01 |
| 5,813,823 | 9/1998 | Hofmeister | 414/744.5 |

FOREIGN PATENT DOCUMENTS

| | | |
|---|---|---|
| 3612962 | 1/1987 | Germany . |
| WO9703395 | 1/1997 | WIPO . |
| WO9747440 | 12/1997 | WIPO . |

*Primary Examiner*—Christopher P. Ellis
*Assistant Examiner*—Douglas Hess
*Attorney, Agent, or Firm*—Burns, Doane, Swecker & Mathis LLP

[57] ABSTRACT

An article positioning apparatus which includes a positioning arm structure on a rigid base structure and elevator structure. The base structure includes an upper flange and a lower flange secured to the upper flange by rigid members extending between the upper flange and the lower flange. The upper flange includes a bore therein. The elevator structure is positioned between the upper flange and the lower flange and itself includes an upper plate and a lower plate. The elevator structure coupled to the positioning arm structure through the bore in the upper flange. The elevator structure includes lead screw members having a respective upper end portion and a lower end portion, extending from the upper plate to the lower plate. In addition, the elevator structure includes a plurality of universal joints supported by the upper plate, one of said plurality of universal joints being associated with one of the lead screw members and being arranged to universally mount the upper plate to a respective lead screw. A seal structure is coupled to the upper flange and the upper plate, the seal structure isolating the upper flange from the elevator structure.

16 Claims, 6 Drawing Sheets

ROBOT HAVING MULTIPLE DEGREES OF FREEDOM IN AN ISOLATED ENVIRONMENT

BACKGROUND OF THE INVENTION

1. Field of the Invention

The present invention relates to a precision arm mechanism suitable for positioning various objects such as semiconductor wafers, cassettes holding such wafers, panels, computer hard discs, and the like for processing and/or use, and specifically for manipulating such objects in a isolated environment such as a vacuum.

2. Description of the Related Art

The use of robot arms for positioning and placing objects is well known. Generally, the arms have Z, R and θ motion as defined in a conventional cylindrical coordinate system. The capability of providing straight line motion is very important in the processing of semiconductor wafers so as to allow them to be very accurately positioned at a work station where processing steps take place. The R or straight line radial movement of the end effector or mechanical hand at the end of the arm has been accomplished in a number of manners.

Any number of robot arm designs are utilized in the industry. However, these arms have difficulty dealing with the problem of angular misalignment of the object to be manipulated.

As one example, telescoping arms have been utilized for manipulating objects. In such a structure one slidable member fits within another thus allowing linear extension of the arm.

More commonly, two link arms with equal length links have been utilized for this purpose. The links are connected to each other so that the distal end of the first link is pivotally attached to the proximal end of the second link. The links utilize belt drives which are provided for coordinately rotating the second link to the first link to provide a rotation ratio suitable for manipulating the arms in a desired fashion.

It is also known to utilize an isosceles triangle type linkage wherein two equal length links are pivoted together and a mechanical hand is pivoted to the distal end of the distal link. Pulleys and belts are utilized in such a manner that the angle between the two links changes at twice the rate as do the angles that each of the links makes with a line connecting the points about which their other ends are pivoted.

In previously mentioned U.S. Pat. No. 5,064,340, which is incorporated herein in its entirety by reference, an arm structure is disclosed comprising first, second and third longitudinally extending links each having proximal and distal end portions.

U.S. Pat. No. 5,007,784, which is incorporated herein in its entirety by reference, provides a robotic arm which comprises an end effector structure which has a central portion and two substantially oppositely extending hands each capable of picking up a workpiece.

One limitation of all the foregoing prior art arms is their limitation to a single Z axis on rotation at the bend of the arm mounted to an elevator or other mounting platform. As noted above, a very important problem which exists with present day robotic arm mechanisms is that they can only follow a radial straight line (R) path or a circular (θ) path in the R, θ plane from one point to another. Accordingly, if there is an object to be picked up and moved which is located in a cassette, e.g., a wafer cassette, or at a work station, the arm must first be extended radially into the cassette or work station where it picks up the object, generally by application of a vacuum, then withdrawn radially from the cassette or work station, then rotated to opposite another cassette or work station and then advanced radially into the other cassette or work station where it deposits the object. Also, if there is an obstacle which protrudes into that plane of operation of the arm as may occur in a semiconductor processing operation, an inefficient path must be followed to anything hidden behind or shadowed by that obstacle, namely, a straight line path must be followed to withdraw the arm radially inwardly beyond the obstacle and then radial motion must be imparted to move the end effector of the arm past the obstacle followed by radial outward motion to the desired work station. The ability to follow a curved path would be desirable in that it would allow faster operation of the robotic arm mechanism.

A particular problem which occurs with flat display panels is that they are often present in cassettes with a certain degree of angular and linear misalignment. Such panels must be aligned properly at a work station. With conventional robotic arms this must be accomplished by placing the panel on a chuck, which has sensors, e.g., CCD sensors, which detect the misalignment, using the chuck to rotate the panel, and then picking it up and transporting it to the work station in proper alignment. This is so since with conventional robotic arms the arm cannot be rotated with respect to the panel (or wafer) coordinate frame which does not coincide (due to the position and angular misalignment) with the coordinate frame of the end effector. The conventional arms can move only along the longitudinal axis of the end effector, and to rotate it so it cannot compensate for the misalignment without intermediately being dropped onto a pin or the like. It would be highly desirable if the desired alignment could be attained without the intermediate use of such a chuck or pin. In a similar manner, it would be highly desirable if it was possible to align wafers about their geometric centers without utilizing such a chuck or pin.

Another problem which is common with both wafers and panels which are loaded from cassettes or picked up at work stations is that the Z axis of the robotic arm may not be completely parallel to the axis of the cassette, etc. due to alignment errors. The relative tilt may be in any direction and is usually only a few degrees. When this misalignment is present the arm cannot properly approach and pick up the wafers/panels with the end effector properly aligned whereby the exact positioning of the wafers/panels is not fully controllable. Previously filed U.S. patent application Ser. Nos. 08/661,292, filed Jun. 13, 1996, and application Ser. No. 08/788,898, filed Jan. 23, 1997, each of which is incorporated herein in its entirety, disclose robotic arms having a universally tiltable Z-axis.

With prior art robotic arms for processing semiconductor wafers and flat panels the cassettes and work stations must generally be aligned so as to be entered by the end effectors of the arms with the end effector moving radially in a straight line. It is not, for example, possible to enter the cassettes or workstations if their longitudinal axes are not parallel to the Z axis. Yet, since space is at a premium in a wafer or flat panel processing operation it would be highly desirable to be able to so arrange cassettes and/or workstations.

Typically such robotic arms are useful in the processing of semiconductor wafers wherein the production occurs in a vacuum or isolated environment. The movement of the robot occurs in the vacuum, but the arm must be mounted on an elevator structure, such as that disclosed in co-pending application Ser. No. 08/788,898 in order to provide greater degrees of freedom to the arm. However, in embodiments providing robots with a universally tiltable Z axis, no provision has heretofore been made for operation and isolation of the robot arm in a vacuum.

SUMMARY OF THE INVENTION

The invention, roughly described, comprises an article positioning apparatus which includes a positioning arm structure on a rigid base structure and elevator structure. The base structure includes an upper flange and a lower flange secured to the upper flange by rigid members extending between the upper flange and the lower flange. The upper flange includes a bore therein. The elevator structure is positioned between the upper flange and the lower flange and itself includes an upper plate and a lower plate. The elevator structure coupled to the positioning arm structure through the bore in the upper flange. The elevator structure includes lead screw members having a respective upper end portion and a lower end portion, extending from the upper plate to the lower plate. In addition, the elevator structure includes a plurality of universal joints supported by the upper plate, one of said plurality of universal joints being associated with one of the lead screw members and being arranged to universally mount the upper plate to a respective lead screw. A seal structure is coupled to the upper flange and the upper plate, the seal structure isolating the upper flange from the elevator structure.

BRIEF DESCRIPTION OF THE DRAWINGS

The invention will be described with respect to the particular embodiments thereof. Other objects, features, and advantages of the invention will become apparent with reference to the specification and drawings in which.

DETAILED DESCRIPTION OF THE PREFERRED EMBODIMENTS

The invention provides a useful robotic structure for use in environments requiring a sealed or isolated environment, such as a vacuum environment in which a semiconductor process is occurring. The invention includes means for isolating the mounting elevation structure from the arm structure, so that the arm structure operates in the isolated or vacuum environment with an improved range of motion while not affecting the environment outside of the processing chamber.

For a better understanding of the invention it should be noted that the terms "belt", "belt means", "pulley" and "pulley means" are, at times, referred to as gearing. It should further be understood that the terms "belt" and "belt means" are used broadly to include toothed and untoothed constructions, chains, fabric belts, woven belts and the like. They may be constructed of any suitable material, natural or synthetic, organic, inorganic, polymeric, composite or metallic. Likewise the terms "pulley" and "pulley means" are used broadly to include toothed and untoothed constructions, constructions which positively engage with respective belts or which engage only frictionally with such belts. They too may be constructed of any suitable material, natural or synthetic, organic, inorganic, polymeric, composite or metallic. It should also be mentioned that the terms "vertical" and "horizontal" are occasionally used herein to simplify discussions of certain embodiments of the invention. It should be recognized that these terms are used for ease of explanation and that what is meant is simply two mutually perpendicular axes. With this in mind the following detailed discussion of the invention will be set forth.

Figures 1A, 1B, 1C:
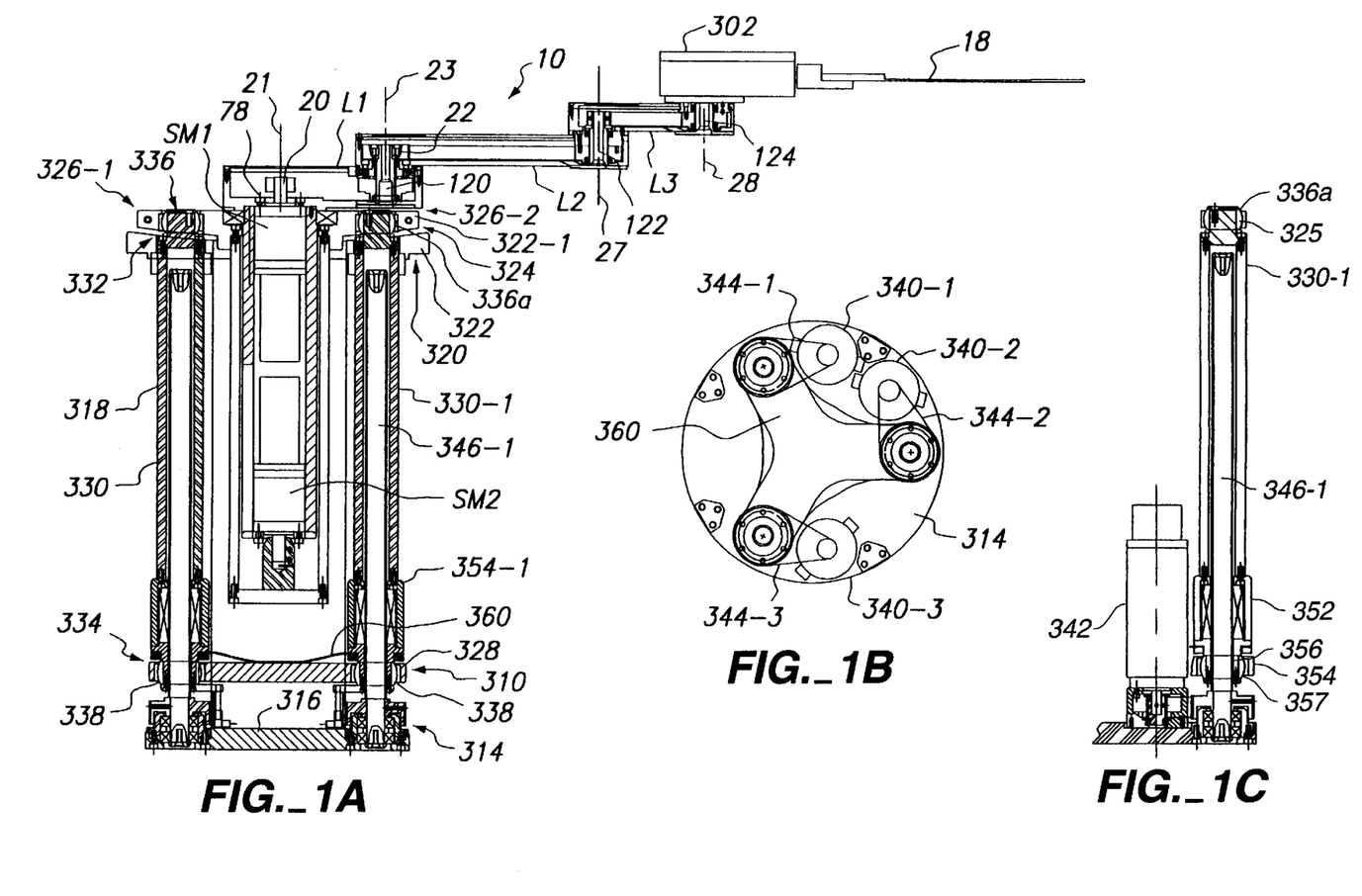
FIG. 1A shows a side view robot having multiple degrees of freedom like that disclosed in co-pending application Ser. No. 08/788,898.
FIG. 1B is a top view a side view of an elevator structure suitable for use with the robotic arm structure shown in FIG. 1 in accordance with the present invention.
FIG. 1C is a partial side view of a portion of the elevator structure of the robot of the present invention.

FIGS. 1A–1C show one embodiment of a robot having multiple degrees of freedom such as that shown in co-pending application Ser. No. 08/788,898. The robot includes a robotic arm structure 10 mounted on a universal elevator structure providing a universally tiltable Z axis. The robotic arm structure is useful in, for example, positioning wafers in a semiconductor processing system.

The operation of the radial drive components are substantially the same as those described in U.S. Pat. No. 5,064,340. It should be noted that the effective length of each link is defined as the distance between a first pivot axis where the proximal end of that link is pivotally mounted and a second pivot axis where the proximal end portion of the next link is pivotally mounted. The radial drive rotatable shaft 20 rotates relative to a robot base. The radial drive rotatable shaft 20 motivates a pulley-drive wheel which rotates therewith. The drive wheel is coaxial with the first axis 21. The first link L1 is pivotally mounted to the robot base at a bearing structure.

A post 120 is mounted to the distal end portion of the first link L1 along a second pivot axis 23. The post 120 has a second effectively cylindrical surface on it with the second effectively cylindrical surface being cylindrical about the second pivot axis 23. The second link L2 is pivotally mounted relative to the post 120 by bearings 22, whereby the second link L2 is rotatable at its proximal end portion about the second pivot axis 23. The second link L2 has a second pulley surface aligned opposite the first pulley surface and it has a third pulley surface aligned opposite a fourth pulley surface located about a third axis 27. A third link arm L3 rotates about a second post 122 and axis 22, and an additional belt/pulley arrangement is provided for link arm L3. In FIG. 1A a belt/pulley arrangement may serve to rotate the end effector 18 which is rotatably mounted via bearings about a post 124 mounted to the distal end portion of the third link L3. Belts serve to impart the needed rotation about the various axes in FIG. 1A. If desired, gearing can be provided in the first link L1 between the first axis 21 and the second axis 23. Such is shown in previously mentioned U.S. Pat. No. 5,064,340.

A radial drive sensor (not shown), which may comprise an incremental photo encoder, is provided for measuring a quantity indicative of the rotational position about the axis 21 of the radial drive shaft 20 and for generating an electronic signal representative of the rotational position of the radial drive shaft 20. For convenience and accuracy the quantity actually measured which is indicative of the rotational position of the radial drive shaft 20 is the rotational position of an extension of the shaft 20, i.e., the rotational position of the radial drive motor, i.e., Servo Motor 1 (SM1). Since the two quantities are proportional to one another the resulting electronic signal is indicative of the desired quantity, namely, the rotational position of the radial drive shaft 20. The photo encoder can be in the nature of a light source and a light sensor aligned to receive light from the light source when the light path is not blocked off.

A connector communicates an electronic signal representative of the rotational position of the radial drive shaft 20 to a control mechanism, such as an electronic computer. An additional sensor (not shown) are provided for measuring a quantity indicative of the rotational position of the rotary drive shaft 78 and for generating an electronic signal representative of the rotational position of the rotary drive shaft 78 about the first axis 21.

Various other uses and implementations of robotic arms suitable for use in accordance with the present invention are provided in co-pending application Ser. Nos. 08/661,292 and 08/788,898, which are fully incorporated herein by reference.

FIGS. 1A–1C also illustrate a generally universal tilt adjustable elevator structure 310. The elevator is shown in its retracted form. It should be noted that correcting for misalignment of cassettes or workstations from being parallel with the primary axis 21 is achieved when tilting is provided by an elevator 310 which transports the arm assembly 10 along the primary axis 21. Basically, the elevator 310 tips enough to align the axis 21 with the more or less vertical axis of the cassette/workstation holding wafers/panels and the motor 302 serves to tilt the end effector 18 so that it approaches the wafers/panels in completely proper angular alignment to pick them up and deliver them for processing. Other corrections which are needed are made as explained in more detail below.

The elevator structure 310 is made up of two distinct portions, namely, a rigid frame 312 which includes a base 314 having an upwardly facing generally planar surface 316, a rigid vertical structure 318 having a structure upper end portion 320, the rigid structure 318 extending upwardly generally orthogonally from the planar surface 316 to the structure upper end portion 320 and a flange 322 attached to the structure upper end portion 320, the flange 322 being generally parallel to the planar surface 316.

The second part of the elevator 310 is a movable elevator structure 324 which is telescopically mounted to the rigid frame 312. It moves up and down through an opening 325 in the flange 322. The movable elevator structure 324 includes an upper plate 326, a lower plate 328 which is positioned at a spaced distance from and generally parallel to the upper plate 326 and at least three non-coplanar linearly extending generally parallel members 330. Each of the members 330 has a respective upper end portion 332 and a respective lower end portion 334. Each of the members 330 extends from the upper plate 326 to the lower plate 328. The members 330 are each generally (but not exactly during tilting) orthogonal relative to the plates 326 and 328. Generally, the non-coplanar members are substantially equally spaced about the peripheries of the upper plate 326 and the lower plate 328.

A plurality of upper universal joints 336 are supported by the upper plate 326. The term "universal joint" as used herein includes joints with either two or three degrees of freedom as well as any other kinematically equivalent joint that can be used to restrict the motion of the plate or other member to which it is connected. The number of upper universal joints 336 is equal to the number of linearly extending members 330. Each of the upper universal joints 336 is arranged to universally mount the respective upper end portion 332 of a respective one of the linearly extending members 330 to the upper plate 326. Likewise, there are a plurality of lower universal joints 338 which are supported by the lower plate 328. The number of lower universal joints 338 is equal to the number of linearly extending members 330. Each of the lower universal joints 338 is arranged to universally mount the respective lower end portion 334 of a respective one of the linearly extending members 330 to the lower plate 328.

Motor means 340, as seen in FIG. 1B, are rigidly supported, generally by the base 314. It serves for motivating each of the linearly extending members 330 independently of each other of the linearly extending members 330 toward and away from the base 314. The preferred motor means comprises three separate motors, one of which, 342, is shown in FIG. 1C. Each motor operates via a respective belt and pulley arrangement 344-1–344-3 to rotate a respective lead screw 346 which is mounted for rotation relative to the base 314 and to the flange 322. A bracket 352 is attached to the linearly extending member 330 and has an extending arm 354 which defines a bore 356 which includes a thread follower structure 357, for example, a ball screw bearing or mating threads, which engages with the lead screw 346. Thereby, rotation of the lead screw 346 under the impetus of the motor 342 causes the bracket 352 to move in a direction determined by the direction of rotation of the motor 342 which in turn leads to linear motion of the linearly extending member 330 (and to tilting of the upper plate 326 and of the lower plate 328 if all motors are not operating identically). A single motor along with a more complex pulley/belt arrangement and appropriate gearing and/or clutching can alternatively be utilized.

Elevator screws 346-1 are positioned within the arm members 330-1 to allow for a more compact arrangement for the elevator structure, making it suitable for applications wherein the physical space for the robot is limited. A spring member 360 is positioned at the base of the frame 312 to ensure that the parallel arm members 330-1 do not rotate. Three motor means 340-1, 340-2, 340-2 are coupled to three belt and pulley arrangements 344-1, 344-2, 344-3, respectively, to rotate the screws to raise and lower the platform 322-1 in accordance with the above description.

The elevator structure 310 in accordance with the present invention is generally useful in combination with the robot structure 10 described herein which can be suitably mounted to the elevator structure 324, generally to the upper plate 326 or to the lower plate 328 as illustrated in FIG. 1A. As shown it is mounted to the upper plate 326. The particular apparatus illustrated in FIG. 1A includes an end effector 18 pivotally connected to a forearm L3. The end effector 18 would conventionally include vacuum pickup means which are useful for picking up semiconductor wafers and the like. All are conventionally controlled by the electronic computer.

It should be understood that there must be some elasticity inherent in the formation of the table shown in FIGS. 1A–1C. In one embodiment, the universal joints discussed above are somewhat elastic with the rods and the table being rigid. The reason for such elasticity is the change in the linear distance of the joint center-to-center relationship when the table is at an angle. The distance (I) from the center of the respective joints 338 to each other is equal if the symmetrical relationship is maintained. If the upper platform 326 has a first end 326-1, higher than the second end 326-2, the distance (I) between the respective centers of the universal joints 338 will be greater by a distance d1 than in the symmetrical case. This requires that the universal joints be elastic enough to allow for the variation of the distance d1 in the movement of the table. The bushings have an elastic element positioned therein to allow for the variation d1. Alternatively, the rods themselves can elastically deform. It should be apparent to one of average skill that elasticity may occur in both the rods and the joints due to the finite stiffness of the materials used in construction.

In the present specification, FIGS. 2–5 show an embodiment of the elevator structure suitable for use in environments wherein the robotic arm is intended for use in a controlled atmosphere, such as a vacuum. In a unique aspect of the invention, the mounting area where the robot structure 10 is mounted to the elevator structure is isolated from the balance of the universal elevator structure by an isolation structure. In a further unique aspect, all motors and shafts are designed in a confined area within the form factor of the base elevator structure.

Figure 2:
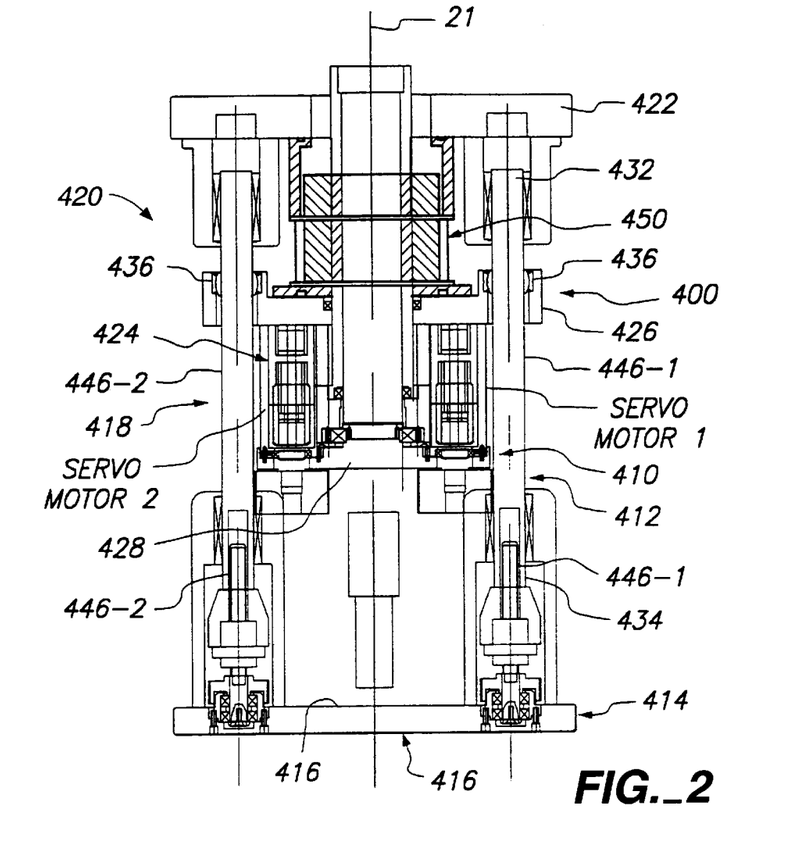
FIG. 2 is a side view of an elevator structure in accordance with the present invention.
Figure 3:
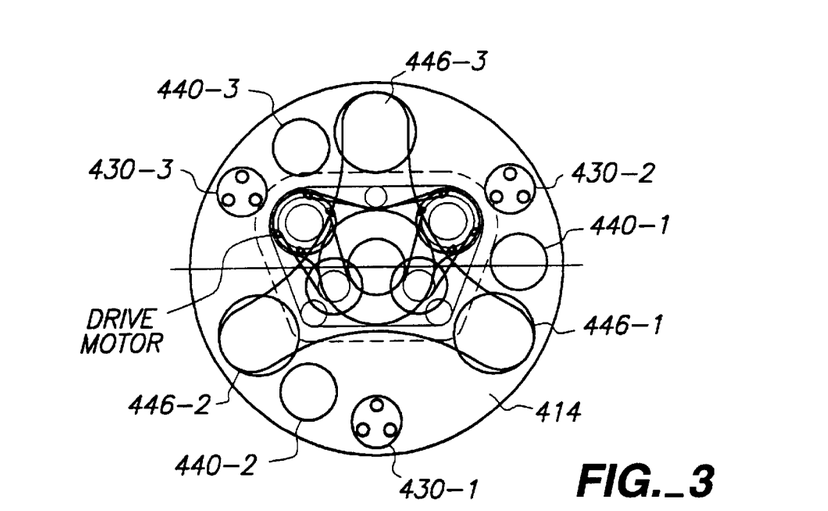
FIG. 3 is a top view of the elevator structure shown in FIG. 2.

FIG. 2 shows a side view of the elevator structure 400 of the present invention. The elevator structure 400 comprises a rigid frame 412 which includes a base 414 having surface 416, a rigid vertical structure 418 having a structure upper end portion 420, the rigid structure 418 extending upwardly generally orthogonally from the planar surface 416 to the structure upper end portion 420 and a flange 422 attached to the structure upper end portion 420, the flange 422 being generally parallel to the planar surface 416. At least three, non-coplanar, linearly extending, generally parallel members 430-1–430-3 (shown in FIG. 3 and omitted in FIG. 2 for clarity) support the upper end and lower end portions.

The movable elevator structure 424 is telescopically mounted to the rigid frame 412. It should be noted that the movable structure 424 is shorter than the moveable frame shown in FIG. 1A, and 3, the distance the frame is expected to travel is significantly less. The movable elevator structure 424 includes an upper plate 426, and a lower plate 428 which is positioned at a spaced distance from and generally parallel to the upper plate 426. The servo motor for rotating the belt and pulley arrangements of the robotic arm structure are positioned on lower plate 428, enabling further space conservation in the robot of the present invention. Also included are three rotating elevator members 446-1, 446-2, 446-3, each of which has a respective upper end portion 432 and a respective lower end portion 434.

Figure 4:
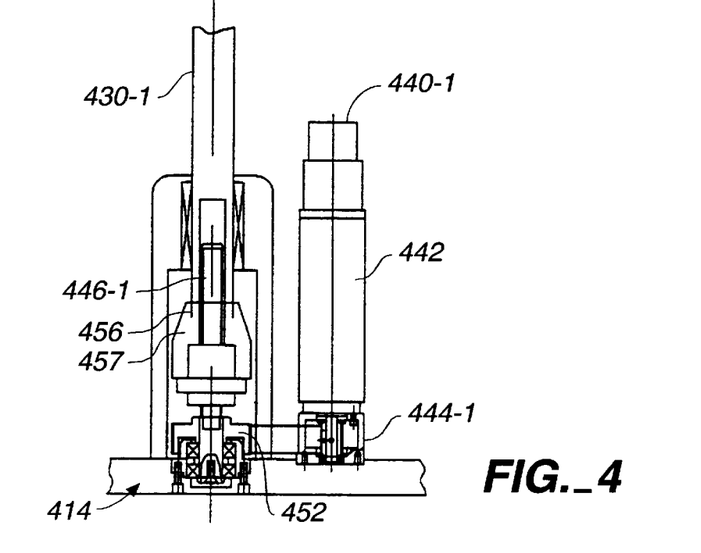
FIG. 4 is a partial side view of the motors used in the elevator structure shown in FIG. 2.

A plurality of universal joints 436 are supported by the upper plate 426. Motor means 440-1, as seen in FIG. 4, are rigidly supported, generally by the base 414. Elevator screws 446-2, 446-3 are positioned within the arm members 430-1 to allow for a more compact arrangement for the elevator structure, making it suitable for small footprint environments. Three motor means 440-1, 440-2, 440-3 are coupled to three belt and pulley arrangements 444-1, 444-2, 444-3, respectively, to rotate the screws 446-1, 446-2, 446-3 to raise and lower the platform structure 424 in accordance with the above description.

As shown in FIG. 2, the movable portion of the elevator structure comprising shafts 486 extend the mounting shaft through a bore in the upper member 426.

Each of the elevator screws 446-1, 446-2, 446-3 can be rotated independently of each other toward and away from the base 414. One motor means comprises three separate motors, one of which, 442, is shown in side view FIG. 4. Each motor operates via a respective belt and pulley arrangement 444 to rotate a respective lead screw 446 which is mounted for rotation relative to the base 414 and to the flange 422. Each of the lead screws 446 is mounted on a pulley support coupled to bearings mounted in the base 414 of the structure. The upper portion 432 of each shaft 430 is secured in the upper plate 426 by bearings. A bore 456 which includes a thread follower structure 457, for example, a ball screw bearing or mating threads, which engages with the lead screw 446. Thereby, rotation of the lead screw 446 under the impetus of the motor 442 causes the bracket 452 to move in a direction determined by the direction of rotation of the motor 442 which in turn leads to linear motion of the linearly extending member 430 (and to tilting of the upper plate 426 and of the lower plate 428 if all motors are not operating identically). A single motor along with a more complex pulley/belt arrangement and appropriate gearing and/or clutching can alternatively be utilized. Each of the rotating shafts 446 is provided in a mounting structure 452 on base 414. The mounting structure isolates bearings securing the lead screws 446 to the base 414. Likewise, upper mounting structures 454 include bearings for securing the upper portion 432 of the screws 446.

Figure 5:
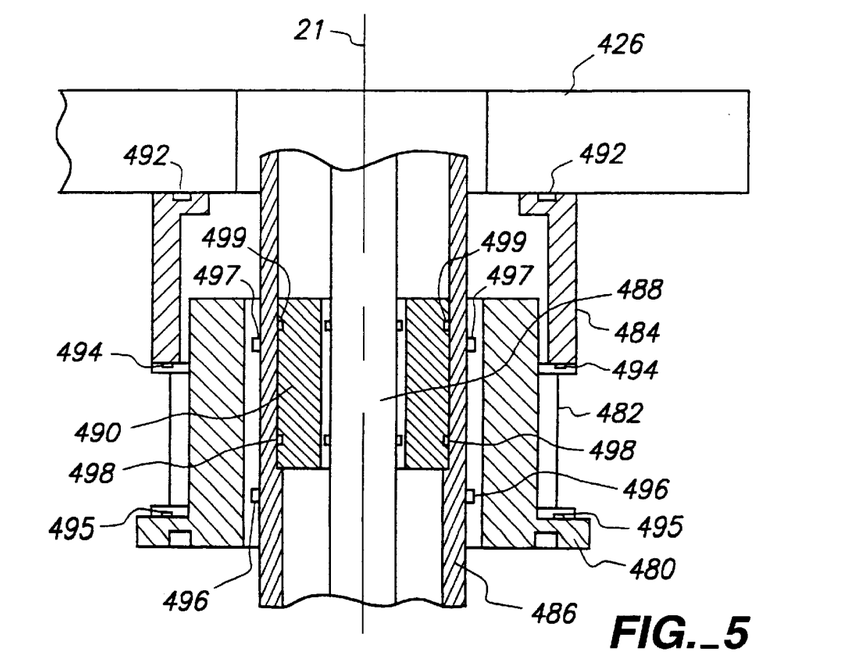
FIG. 5 is an enlarged plan view of the seal for the elevator structure of the present invention.

One embodiment of the isolation structure is illustrated in further detail in FIG. 5. The structure includes an outer shaft 486 upon which the robot structure 10 may be mounted for rotation. An inner shaft 488 is coupled to the belt and pulley arrangement to rotate link L1, and secured to an inner seal 490. The inner seal is a ferro-fluidic seal between the inner shaft and the outer shaft to allow respective movement of the shafts. O-rings 499 secure the inner seal 490 to the outer shaft 486, and O-rings 489 secure the inner seal to the inner shaft. The o-rings may be comprised of a material such as silicon rubber. Inner seal 490 rests on a flange 491 on the interior portion of the outer shaft 486. The outer shaft is surrounded by a bellows seal comprising the outer seal member 480 and member 484. Member 480 is secured to member 484 by bellows member 482 using o-rings 494,495. Bellows member 482 is made of a pliable material such as flexible sheet metal (ss 304) having a thickness of about $30/1000$", to allow member 480 to move in proportion to the movement of the outer shaft deviating from axis Z1.

Figure 6:
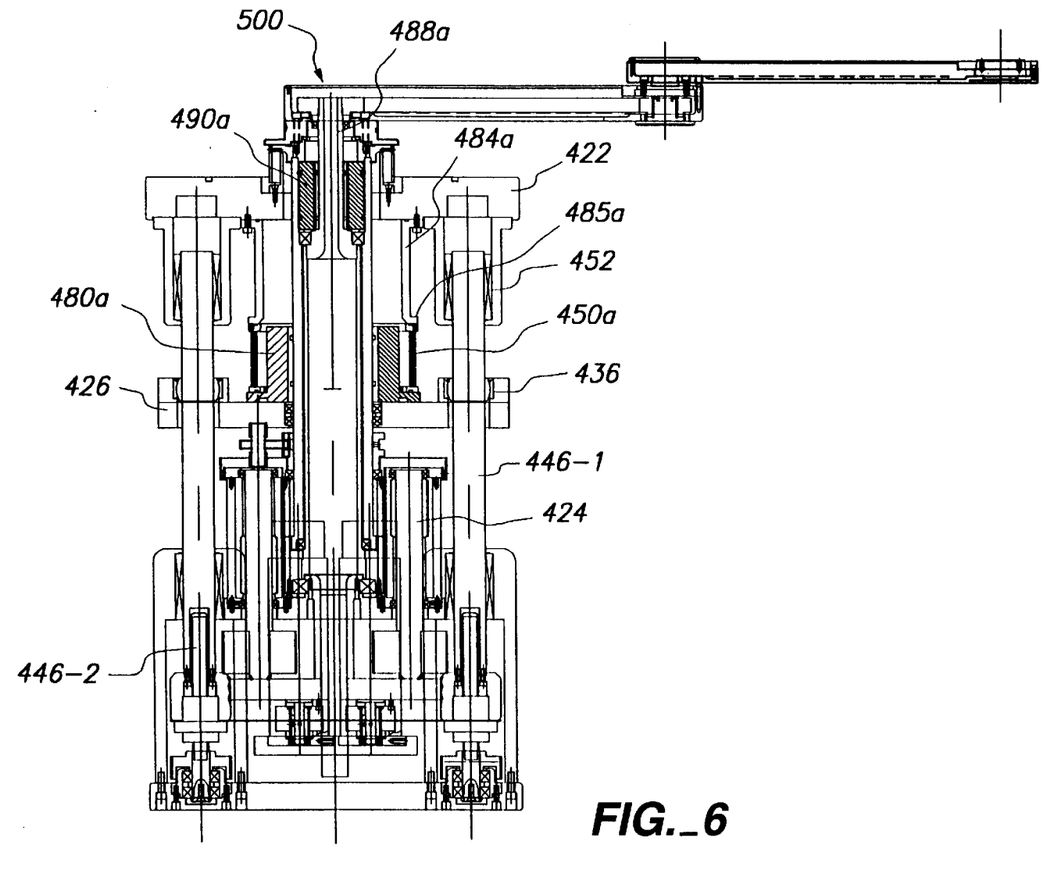
FIGS. 6 and 7 are side views of a second embodiment of the robot of the present invention.
Figure 7:
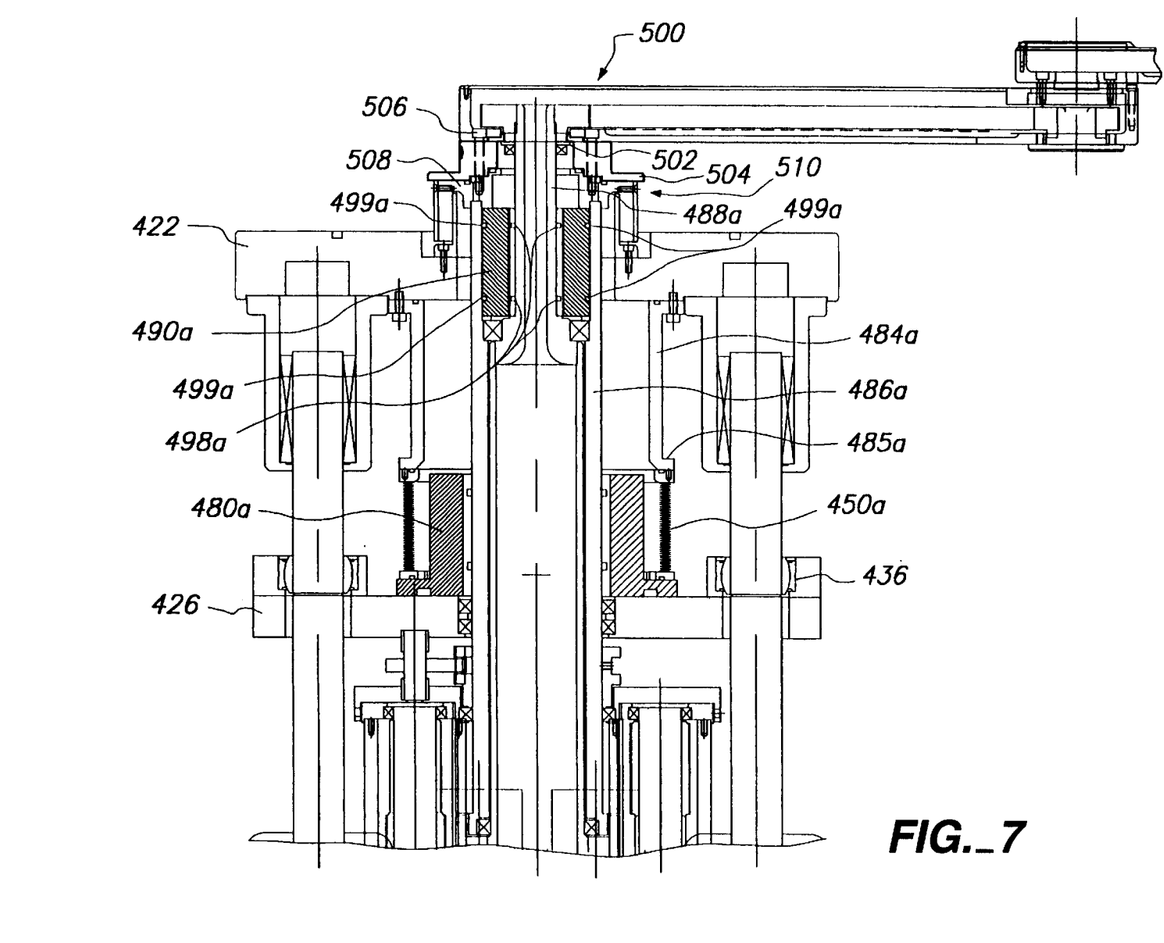

FIGS. 6 and 7 illustrate a second embodiment of the elevator structure of the present invention for use in a vacuum environment. FIGS. 6 and 7 also illustrate how an exemplary robotic arm structure 500 may be attached to the elevator structure 400 of the present invention, in the embodiment previously described, or embodiments hereinafter described. As shown in FIGS. 6 and 7, inner seal 490a is positioned adjacent to upper flange 422. Member 484a has a lower flange 485a which is coupled to bellows member 450a. Bellows member 450a surrounds the outer ferrofluidic seal 480a. Inner ferro-fluidic seal 490a is coupled to shaft 488a by O-rings 498a, and to outer shaft 486 by O-rings 499a. Arm member 500 is coupled to elevator structure 400 by a mounting assembly 510 which includes bearings 502, and mounting flange 504 secured by bolts 506 to assembly 508. Members 446-1,446-2 are coupled via linear bearing 452.

Figure 8A:
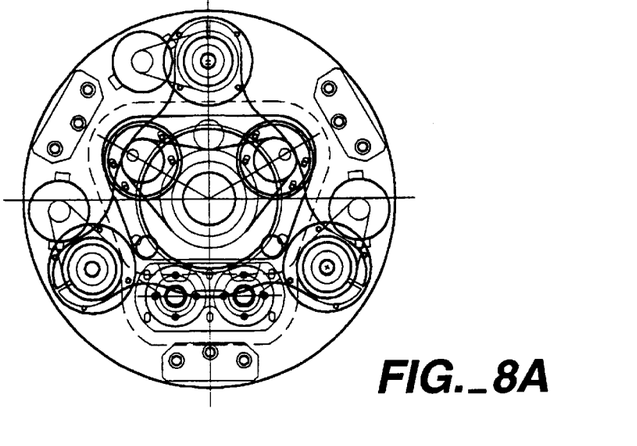
FIGS. 8A and 8B are top and side views of a third embodiment of the robot of the present invention.
Figure 8B:
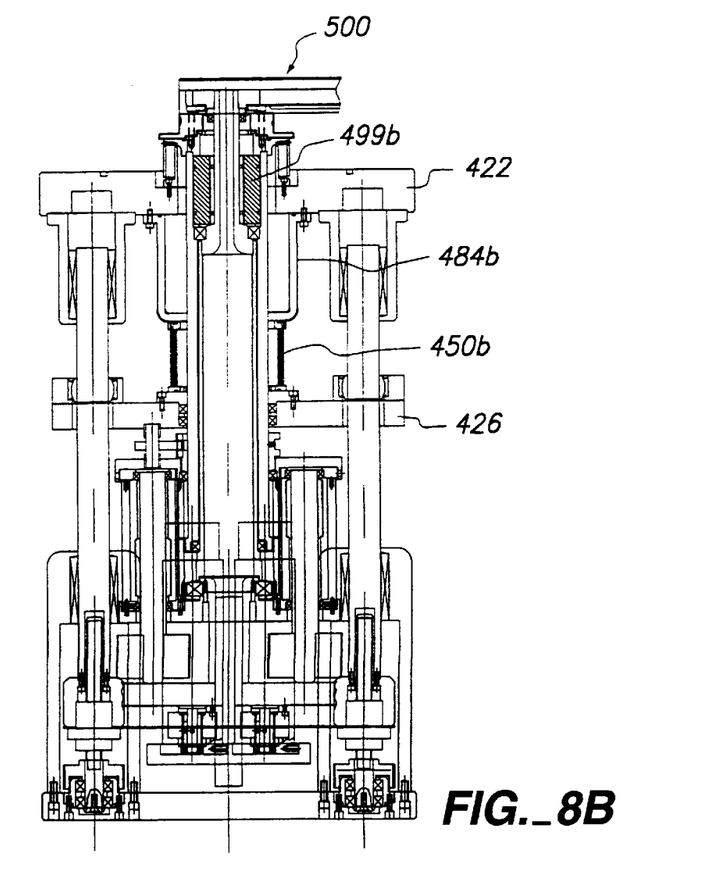

FIGS. 8A and 8B show yet another alternative embodiment of the present invention. As shown in FIG. 8, the elevator structure does not include an outer ferro-fluidic seal, but rather includes only an inner ferro-fluidic seal 499b positioned coincident with the upper flange 422. Member 484b is secured to bellows 450b which is, as defined in previous embodiments, comprised of a thin sheet metal allowing the bellows to flex as the elevator structure moves. The embodiment shown in FIG. 8 may be utilized in pressure ranges where the severity of the vacuum is less stringent than those in which the first or second embodiment of the present invention is utilized.

It should be noted that the robotic arm described with respect to FIGS. 1A–1C is only one of numerous robotic arms which may be utilized with the elevator structure of the present invention. For example, and without limitation, the robotic arms of U.S. Pat. No. 5,064,340 or U.S. patent application Ser. No. 08/432,682, and other applications described with respect to the prior art, can also be used. The representation of arm structure 500 in FIGS. 6–8 is exemplary of how such a robotic arm structure might be coupled to the elevator structure of the present invention.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of claims which may be supported herein.

What is claimed is:

1. A universal tilt adjustable elevator structure for positioning an apparatus for picking up an article, comprising:
   a rigid frame comprising:
      a base having an upwardly facing generally planar surface;
      a rigid structure having a structure upper end portion, the structure extending upwardly generally orthogonally from the planar surface to the structure upper end portion; and
      a flange attached to the structure upper end portion, the flange being generally parallel to the planar surface; and
   a movable and tiltable elevator structure telescopically mounted to the rigid frame, comprising:
      an upper plate;
      a lower plate positioned a spaced distance from and generally parallel to the upper plate;
      at least three non-coplanar linearly extending generally parallel members, each of the members having a respective upper end portion and a respective lower end portion, each of the members extending from the upper plate to the lower plate, the members each being generally orthogonal relative to the plates;
      a plurality of universal joints supported by the upper plate, the number of upper universal joints being equal to the number of linearly extending members, each of the upper universal joints being arranged to universally mount the respective upper end portion of a respective one of the linearly extending members to the upper plate;
      a seal structure positioned adjacent to the upper plate isolating the elevator structure from a controlled environment on top of the upper plate; and
   motor means supported rigidly relative to the base for motivating each of said linearly extending members independently of each other of said linearly extending members selectively upwardly and downwardly.

2. An elevator structure as set forth in claim 1, wherein the motor means comprises:
   a plurality of individual motors supported by the base, the number of motors being equal to the number of linearly extending members, each of the motors being connected to motivate a corresponding one of the linearly extending members selectively upwardly and downwardly.

3. An elevator structure as set forth in claim 2, wherein the connection of each of the motors to motivate the corresponding one of the linearly extending members comprises:
   a plurality of lead screws supported between the base and the flange and being rotatable relative thereto, the number of lead screws being equal to the number of linearly extending members, each lead screw being located adjacent and parallel to a respective one of the linearly extending members, each of the motors being connected to rotate a corresponding one of the lead screws; and
   a plurality of belt means, the number of belt means being equal to the number of motors, each belt means being driven by a corresponding one of the motors and being engaged to rotate a corresponding one of the lead screws.

4. The apparatus of claim 1 wherein the seal structure includes:
   an inner shaft;
   an outer shaft surrounding the inner shaft;
   a ferro-fluidic seal between the inner and outer shaft; and
   a bellows structure surrounding the outer shaft.

5. The apparatus of claim 4 wherein the bellows member comprises:
   a first cylindrical member surrounding and coupled to the outer shaft;
   a second cylindrical member surrounding a portion of the first member and coupled to the upper plate; and
   a pliable bellows member surrounding the first member and coupled to the first and second members.

6. An apparatus as set forth in claim 5, wherein the elevator structure further includes:
   rigidity increasing means attached to the lower plate of the movable elevator structure for increasing the rigidity of the bottom portion of the movable elevator structure.

7. An apparatus as set forth in claim 6, wherein the motor means comprises:
   a plurality of individual motors supported by the base, the number of motors being equal to the number of linearly extending members, each of the motors being connected to motivate a corresponding one of the linearly extending members upwardly and downwardly.

8. An apparatus as set forth in claim 7, wherein the connection of each of the motors to motivate the corresponding one of the linearly extending members comprises:
   a plurality of lead screws supported between the lower plate and the upper plate and being universally rotatable relative thereto, the number of lead screws being equal to the number of linearly extending members, each lead screw being located adjacent and parallel to a respective one of the linearly extending members, each of the motors being connected to rotate a corresponding one of the lead screws; and
   a plurality of belt means, the number of belt means being equal to the number of motors, each belt means being driven by a corresponding one of the motors and being engaged to rotate a corresponding one of the lead screws.

9. An apparatus as set forth in claim 8, wherein the motor means comprises:
   a plurality of individual motors supported by the lower plate, the number of motors being equal to the number of linearly extending members, each of the motors being connected to motivate a corresponding one of the linearly extending members upwardly and downwardly.

10. A combined elevation and article positioning apparatus, comprising:

a rigid frame comprising:
   a base having an upwardly facing generally planar surface;
   a rigid structure extending upwardly generally orthogonally from the planar surface to a structure upper end portion; and
   a flange having a generally centrally positioned opening there through, the flange being attached to the structure upper end portion, the flange being generally parallel to the planar surface; and a movable elevator structure telescopically mounted to the rigid frame, comprising:
   an upper plate;
   a lower plate positioned a spaced distance from and generally parallel to the upper plate;
   at least three linearly extending generally parallel members, each of the members having a respective upper end portion and a respective lower end portion, each of the members extending from the upper plate to the lower plate, the members each being generally orthogonal relative to the plates;
   a plurality of upper universal joints supported by the upper plate, the number of upper universal joints being equal to the number of linearly extending members, each of the upper universal joints being arranged to universally mount the respective upper end portion of a respective one of the linearly extending members to the upper plate;
   a seal structure isolating the opening in the flange from the movable elevator structure;

motor means supported rigidly relative to the base for motivating each of the linearly extending members independently of each other of said linearly extending members upwardly and downwardly; and an article positioning apparatus supported by the elevator structure, the article positioning apparatus extending upwardly through the generally central opening in the flange to above the upper plate.

11. The apparatus of claim 10 wherein the seal structure includes:
   an inner shaft;
   an outer shaft surrounding the inner shaft;
   a ferro-fluidic seal between the inner and outer shaft; and
   a bellows structure surrounding the outer shaft.

12. The apparatus of claim 11 wherein the bellows member comprises:
   a first cylindrical member surrounding and coupled to the outer shaft;
   a second cylindrical member surrounding a portion of the first member and coupled to the upper plate; and
   a pliable bellows member surrounding the first member and coupled to the first and second members.

13. An article positioning apparatus, comprising:
   a positioning arm structure;
   a rigid base structure having an upper flange and a lower flange secured to the upper flange by rigid members extending between the upper flange and the lower flange;
   an elevator structure positioned between an upper plate and a lower plate including an upper plate and a lower plate, the elevator structure comprising:
      three lead screw members having a respective upper end portion and a lower end portion, extending from the upper plate to the lower plate; and
      a plurality of universal joints supported by the upper plate, one of said plurality of universal joints being associated with one of the lead screw members and being arranged to universally mount the upper plate to a respective lead screw;
   a rotational shaft structure coupled to the positioning arm structure; and
   a seal structure coupled to the upper flange and the upper plate and surrounding the rotational shaft, the seal structure isolating the positioning arm structure from the elevator structure.

14. The apparatus of claim 13 wherein the shaft structure includes:
   a inner shaft;
   an outer shaft surrounding the inner shaft; and the seal structure includes:
   a ferro-fluidic seal between the inner and outer shaft; and
   a bellows structure surrounding the outer shaft.

15. The apparatus of claim 14 wherein the bellows member comprises:
   a first cylindrical member surrounding and coupled to the outer shaft;
   a second cylindrical member surrounding a portion of the first member and coupled to the upper plate; and
   a pliable bellows member surrounding the first member and coupled to the first and second members.

16. An article positioning apparatus comprising:
   a positioning arm structure;
   a rigid base structure having an upper flange and a lower flange secured to the upper flange by rigid members extending between the upper flange and the lower flange, the upper flange including a bore therein;
   an elevator structure positioned between the upper plate and the lower plate including an upper plate and a lower plate, the elevator structure coupled to the positioning arm structure through the bore in the upper flange, the elevator structure comprising:
      three lead screw members having a respective upper end portion and a lower end portion, extending from the upper plate to the lower plate; and
      a plurality of universal joints supported by the upper plate, one of said plurality of universal joints being associated with one of the lead screw members and being arranged to universally mount the upper plate to a respective lead screw; and
   a seal structure coupled to the upper flange and the upper plate, the seal structure isolating the upper flange from the elevator structure.

* * * * *